US012671786B2

(12) United States Patent　　　　(10) Patent No.:　US 12,671,786 B2
Spilker et al.　　　　　　　　　　(45) Date of Patent:　　Jun. 30, 2026

(54) SELF-CONFIGURING RECORDING DEVICE FOR IMAGE DATA OF AN IMAGING SENSOR DEVICE

(71) Applicant: dSPACE GmbH, Paderborn (DE)

(72) Inventors: Marco Spilker, Paderborn (DE);
Gregor Sievers, Paderborn (DE);
Christian Lindemann, Paderborn (DE)

(73) Assignee: dSPACE GmbH, Paderborn (DE)

( * ) Notice:　Subject to any disclaimer, the term of this patent is extended or adjusted under 35 U.S.C. 154(b) by 40 days.

(21) Appl. No.: 18/377,612

(22) Filed:　　Oct. 6, 2023

(65)　　　　　Prior Publication Data

US 2024/0121352 A1　　Apr. 11, 2024

(30)　　　Foreign Application Priority Data

Oct. 7, 2022　(DE) ...................... 10 2022 125 946.3

(51) Int. Cl.
H04N 5/77　　　　(2006.01)
H03M 9/00　　　　(2006.01)
　　　　(Continued)
(52) U.S. Cl.
CPC ............... H04N 5/77 (2013.01); H04N 7/035 (2013.01)
(58) Field of Classification Search
None
See application file for complete search history.

(56)　　　　　References Cited

U.S. PATENT DOCUMENTS 11,237,832 B2　　2/2022　Sievers et al.
11,863,712 B1 *　1/2024　Young ................... H04N 23/90
　　　　　　　(Continued)

FOREIGN PATENT DOCUMENTS

CN　　111641765 A　*　9/2020　........... H04N 5/2251
CN　　111757051 A　*　10/2020　............. H04N 7/181
　　　　　　　(Continued)

OTHER PUBLICATIONS

Warra, Jeff; "Wait—I only have a 1TB Drive !!! Welcome to the Age of Autonomous Vehicle Logging", 30. Apr. 2019 - www.intrepidcs. net.cn/wp-content/uploads/2019/05/101._Welcome_to_the_Age_of_ Autonomous_Vehicle_Logging_TD_USA_2019.pdf.
　　　　　　　(Continued)

*Primary Examiner* — Hung Q Dang
(74) *Attorney, Agent, or Firm* — Muncy, Geissler, Olds & Lowe, P.C.

(57)　　　　　ABSTRACT
A recording device for a recording of a serialized image data stream from a sensor device. The recording device comprises a deserializer for deserializing the image data stream. To configure the first deserializer, the recording device comprises a configuration device, which records a configuration data stream transmitted by a receiving device for the purpose of configuring a serializer arranged in the sensor device and derives a configuration of the deserializer of the recording device by an analysis of the recording of the configuration data. In an example, the derivation takes place by an abstraction of the configuration of the serializer into a functionality of the serializer, a derivation of a functionality of the first deserializer from the functionality of the first serializer, and a concretization of the functionality of the first deserializer into a configuration of the first deserializer.

13 Claims, 6 Drawing Sheets

(51) Int. Cl.
  *H04N 5/765* (2006.01)
  *H04N 5/92* (2006.01)
  *H04N 7/035* (2006.01)

(56) References Cited

U.S. PATENT DOCUMENTS

| | | | | |
|---|---|---|---|---|
| 2008/0036864 A1* | 2/2008 | McCubbrey | H04N 7/18 | |
| | | | 375/E7.161 | |
| 2020/0413000 A1* | 12/2020 | Breuer | H04N 5/38 | |
| 2021/0165657 A1* | 6/2021 | Sievers | G06F 13/4291 | |
| 2021/0409510 A1* | 12/2021 | Zerna | H04L 47/621 | |
| 2022/0060655 A1* | 2/2022 | Ohmura | B60K 35/81 | |
| 2022/0070386 A1* | 3/2022 | Dworakowski | H04N 23/617 | |
| 2022/0224857 A1* | 7/2022 | Bao | G06F 13/4291 | |
| 2022/0374376 A1* | 11/2022 | Hyakudai | G06F 13/362 | |
| 2022/0417472 A1* | 12/2022 | Mobbs | G05D 1/0231 | |
| 2023/0026986 A1* | 1/2023 | Jeong | H04N 23/66 | |
| 2023/0199306 A1* | 6/2023 | Takahashi | H04L 1/0045 | |
| | | | 348/211.3 | |

| | | | | |
|---|---|---|---|---|
| 2023/0319420 A1* | 10/2023 | Moon | H04N 1/6077 | |
| 2023/0336861 A1* | 10/2023 | Xu | H04N 23/60 | |
| 2023/0412575 A1* | 12/2023 | Miyamoto | H04L 63/0485 | |
| 2024/0162980 A1* | 5/2024 | Chen | G06F 11/0775 | |

FOREIGN PATENT DOCUMENTS

| | | |
|---|---|---|
| DE | 102019132476 A1 | 6/2021 |
| JP | 2013-081696 A | 5/2013 |
| JP | 2022-035957 A | 3/2022 |

OTHER PUBLICATIONS

Patel Mahendra; "I2C over DS90UB913/4 FPD-Link III with Bidirectional Control Channel"; May 2013 www.ti.com/lit/an/snla222/snla222.pdf.

Texas Instruments; "DS90UB964-Q1 Quad FPD-Link III Deserializer Hub"; SNLS500; Jul. 2016.

* cited by examiner

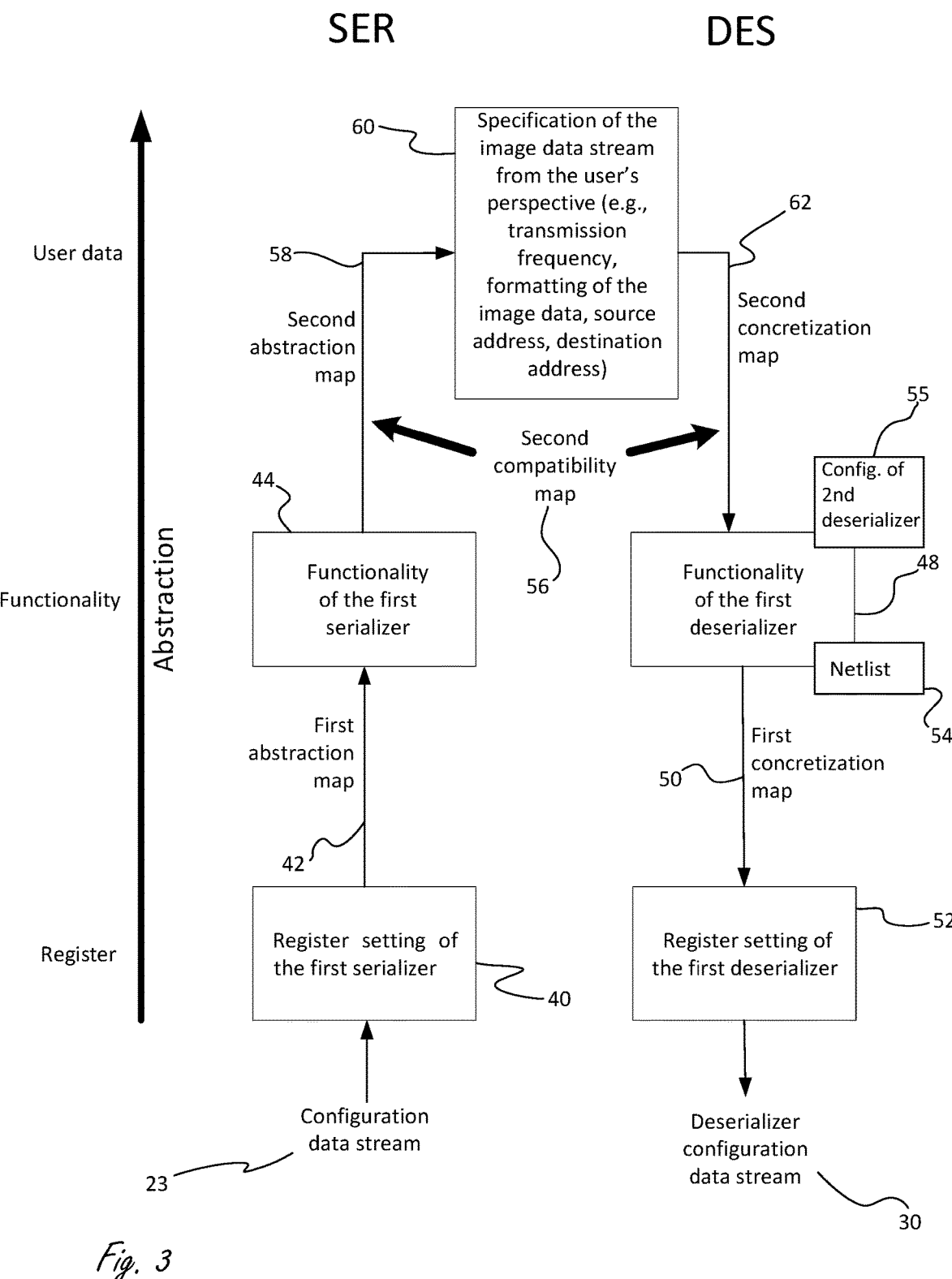

SER

DES

User data

Abstraction

Functionality

Register

60 — Specification of the image data stream from the user's perspective (e.g., transmission frequency, formatting of the image data, source address, destination address)

58 — Second abstraction map

62 — Second concretization map

Second compatibility map

56

44 — Functionality of the first serializer

55 — Config. of 2nd deserializer

Functionality of the first deserializer

48

Netlist

54

First abstraction map

42

First concretization map

50

Register setting of the first serializer

40

Register setting of the first deserializer

52

Configuration data stream

23

Deserializer configuration data stream

SELF-CONFIGURING RECORDING DEVICE FOR IMAGE DATA OF AN IMAGING SENSOR DEVICE

This nonprovisional application claims priority under 35 U.S.C. § 119(a) to German Patent Application No. 10 2022 125 946.3, which was filed in Germany on Oct. 7, 2022, and which is herein incorporated by reference.

BACKGROUND OF THE INVENTION

Field of the Invention

The present invention relates to data loggers for recording image data of imaging sensors. Data loggers of this type have recently gained importance in the automotive industry. During the course of advances in automation, vehicles are being equipped with imaging sensor devices, for example, camera, radar, lidar, or ultrasonic sensors, as well as with control units for evaluating the image data generated by these sensors. These control units generally perform safety-critical tasks and may independently intervene in the control of the vehicle as needed (automation level 2) or even at least temporarily take over the control entirely (automation level 3, 4, or 5). They therefore need complex evaluation before being deployed in the field.

Description of the Background Art

It is known in the prior art to record the image data generated by an imaging sensor device on a recording device, i.e. a data logger, during a test drive of a test vehicle equipped with an imaging sensor device, for the purpose of using the recorded image data later on to develop a computer algorithm which, configured on a control unit, is able to read in and evaluate the image data and control an automated vehicle based on the image data. For example, the recorded images may be used to test the simulation of the algorithm to check whether the algorithm correctly assesses the traffic situations recorded in the image data and generates control commands appropriate for the traffic situation. The image data may also be used to train or test a neural network, which is provided to generate an object list of objects for the algorithm, which may be recognized in the image data for the algorithm. The image data may also be translated into a synthetic scenario, which simulates the traffic situation depicted in the image data as a computer simulation for the purpose of safely testing the algorithm or the control unit in a virtual environment (software in the loop or hardware in the loop).

The transmission of image data from a sensor device to a receiving device configured to process the sensor data, for example a control unit, usually takes place in serialized form. For this purpose, the sensor device comprises a serializer, which converts the continuously arriving raw image data generated by the sensor device into a serial data stream and forwards it to the receiving device via a data link. The receiving device comprises a deserializer, which receives the image data stream from the data link, reverses the serialization thereof, and forwards the deserialized image data stream to downstream components of the receiving device, for example to a processor unit for processing the image data. Prominent suppliers of serializers and deserializers suitable for this purpose are Texas Instruments Inc. with the "FPD-Link" product series and Maxim Integrated with the "Gigabit Multimedia Serial Link" (GMSL) product series.

A recording device configured for recording the image data stream, for example the data logger described above, may be designed as a "man in the middle." A recording device of this type is arranged between the sensor device and the receiving device in such a way that it, instead of the receiving device, first receives the image data stream, stores a recording of the image data stream in a storage device, and finally forwards the image data stream to the receiving device. The recording device does not reveal itself to its two communication partners but rather simulates for them both a direct communication with the communication partner, the sensor device or the receiving device, provided in each case. Alternatively, the recording device may also be designed to receive a copy of the image data stream from a signal splitter.

In both cases, the recording device requires a separate deserializer to deserialize the intercepted image data stream prior to recording it, and in the example as a man in the middle, also requires a separate serializer to re-serialize the image data stream prior to forwarding it to the receiving device. After startup, the receiving device transmits a configuration data stream for configuring the serializer in the sensor device. The recording device may intercept or monitor this configuration data stream and use it directly to configure its own serializer. However, configuring the deserializer installed in the recording device is more complicated. Due to its configuration, it must reconstruct the image data stream serialized by the sensor device, i.e., reverse the serialization carried out by the sensor device, to turn the image data transmitted along with the image data stream into a readable and interpretable form. With the presence of an own serializer in the recording device, the image data stream must also be again identical to the image data stream output by the sensor device after passing through the serializer. While the correct configuration of the deserializer which accomplishes this may be derived from the configuration data stream, this derivation involves a great deal of human service work according to the prior art, which requires a high level of specialized knowledge and takes up a great deal of time.

SUMMARY OF THE INVENTION

It is therefore an object of the invention to simplify the configuration of a recording device for serialized image data streams, in particular a deserializer built into the recording device.

For this purpose, a recording device for a recording of a serialized image data stream flowing from a sensor device to a receiving device is proposed according to the invention. A sensor device is understood to be an arbitrary sensor system, which is designed to generate image data, from which information about a spatial arrangement of objects in the surroundings of the sensor system may be reconstructed. A sensor device may be, for example, a radar system, a lidar system, a camera, a thermal imaging camera, or a sonar system. A receiving device is understood to by an arbitrary technical device for receiving the image data output by the sensor system, for example a control unit which is designed to generate control commands based on the image data.

The recording device comprises a first data interface. The first data interface is designed to establish a first data link between the first data interface and the sensor device for the purpose of transmitting the image data stream to the first data interface. The recording device further comprises a first deserializer, which is configured to deserialize the image data stream received at the first data interface, and a storage device, which is configured to record the image data deserialized by the first deserializer and to store image data from the image data stream on a storage medium. In an example, the recording device comprises a second data interface, designed to establish a second data link between the second data interface and the receiving device for the purpose of transmitting the image data stream to the receiving device, and a first serializer, which is configured to re-serialize the image data stream after it is recorded by the storage device and to output the serialized image data stream with the aid of the second data interface. The first serializer comprises a multiplicity of input pins for receiving image data.

The recording device further comprises a configuration device, which is configured to record a configuration data stream transmitted, in particular via the second data link, from the receiving device to the second data interface, which is actually provided to configure a second serializer arranged in the sensor device. The second serializer is arranged in the sensor device to serialize an image data stream output by a sensor and to feed the serialized image data stream to the first data link. The configuration device analyzes the configuration data transmitted along with the configuration data stream and determines, based on the analysis, a preparation of the serialized image data stream by the second serializer. On the basis of the information obtained by the analysis relating to the preparation of the image data stream, the recording device finally determines a configuration of the first deserializer. This configuration of the first deserializer is such that the deserializer configured according to this configuration reconstructs the image data stream output by the sensor; in other word, it reverses the serialization of the image data stream carried out by the second serializer. The configuration device is further configured to configure the first deserializer according to the configuration after this very configuration of the first deserializer has been determined.

If the recording device comprises a second serializer for the purpose of re-serializing the image data stream after it has been recorded by the storage device and for outputting it by the second data interface, the configuration device may determine, based on the analysis, how the image data stream is to be prepared for the first serializer and distributed to the input pins of the first serializer. In this case, the configuration device organizes the configuration of the first deserializer in such a way that the first deserializer is configured by its configuration to prepare the image data stream as determined in the analysis and to distribute it to the input pins of the first serializer.

The configuration of serializers and deserializers, in particular also the first serializer and the first deserializer, normally takes place with the aid of writable registers of the serializer or deserializer, defined register configurations effectuating certain technical functionalities and behaviors of the serializer or deserializer.

A method is already known from the patent publication DE 10 2019 132 476 A1, which corresponds to US 2021/0165657, which is herein incorporated by reference, for automating the configuration of a serializer, in that configuration data are read out from a configuration data stream, which is actually provided for configuring a serializer of a certain production series, and translating them into a configuration of another serializer from a different production series which has the same technical function. An essential difference of the present invention from this prior art is that a configuration of a deserializer which is situated downstream from the newly configured serializer and must supply the latter with the correct deserialized image data stream is derived from the configuration data stream for configuring a serializer.

The first serializer in the recording device and the second serializer in the sensor device preferably belong to the same production series, and are therefore identical or substantially identical with regard to their technical equipment and configuration. This can be understood to mean, in particular, that any possible configuration of the second serializer is transmittable in the identical way to the first serializer, and that the first serializer and the second serializer behave identically in technical terms when they are both configured identically. For this purpose, the first serializer may be arranged on a removable circuit board, so that, for each sensor device, an individual circuit board may be installed in the recording device, on which a first serializer individually selected for the particular sensor device is arranged, which belongs to the same production series as the second serializer installed in the particular sensor device. This example is advantageous in that the recorded configuration data stream, which is, after all, actually provided for configuring the second serializer of the sensor device, may be used directly to configure the first serializer. However, there may be an increased manufacturing complexity caused by the installation of an individual first serializer for each sensor device.

Alternatively, the first serializer and the second serializer may also belong to different production series. In this example, the method already described in DE 10 2019 132 476 A1 cited above may be used to transmit the configuration of a second serializer predefined by the configuration data into a configuration of the first serializer having the same technical function and to configure the second serializer according to the configuration having the same technical function. This example may be used if the main data channel of the first serializer provided for transmitting the user data, i.e., in particular the image data, to the receiving device is compatible with the receiving device. If this is the case, the installation of an individually selected serializer is omitted in this example, which further reduces the manufacturing complexity of the recording device.

The recording device is preferably configured to intercept the configuration data stream, so that the configuration data stream actually provided to configure the second serializer in the sensor device does not reach the sensor device, and the receiving device configures the first serializer instead of the second serializer with the aid of the configuration data stream. The receiving device may be configured to repeat the process of configuring the second serializer after a failed configuration attempt, for example as a result of a missing confirmation signal from the second serializer. The recording device is therefore particularly preferably configured to intercept configuration data streams repeatedly transmitted by the receiving device, until the configuration of the first deserializer has been completed and the recording device is thus ready to operate.

For the operational readiness of the overall system made up of the sensor device, recording device, and receiving device, it must, of course, be ensured that the second serializer in the sensor device is also finally configured. The recording device is therefore preferably configured to forward configuration data streams repeatedly transmitted after the completion of the configuration of the first deserializer from the receiving device to the sensor device for the purpose of configuring the second serializer. The recording device may alternatively also be configured to independently transmit the recording of the configuration data to the sensor device via the first data link after the completion of the configuration of the first deserializer instead of waiting for a new configuration data stream from the receiving device. The recording device is furthermore preferably configured to receive a confirmation signal transmitted from the sensor device after the completion of the configuration of the second serializer for the confirmation of an operational readiness of the sensor device to the first data interface and to forward it to the receiving device.

A second deserializer for deserializing the image data stream transmitted via the second data link is generally installed in the receiving device. The second deserializer may comprise an interface which may be read out with the aid of the second data link for reading out an existing configuration of the second deserializer. A knowledge of the current configuration of the second deserializer may be helpful or even necessary for the determination of the configuration of the first deserializer. The configuration device is therefore advantageously configured to read out the existing configuration of the second deserializer via the second data link for the analysis of the configuration data and to take it into account for determining the configuration of the first deserializer.

In addition to the configuration of the second deserializer, there are further data whose evaluation by the configuration device is advantageous for determining the configuration of the first deserializer. The configuration device may be configured to take into account a netlist for this purpose, which describes the data links of input pins of the first serializer for receiving image data, including a number of internal data lines of the recording device for transmitting image data to the input pins. After the configuration device has determined how the image data stream is to be distributed to the input pins of the first serializer, the configuration device may determine, based on the netlist, how the internal data lines of the recording device are linked to these very input pins and, based on this information, design the configuration of the first deserializer in such a way that the first deserializer distributes the formatted image data accordingly to the data lines so that the image data arrive at the input pins of the first serializer according to the determined distribution.

In particular, if an individual first serializer is installed in the recording device and belongs to the same production series as the second serializer, the netlist is an important piece of information, since, in this example, the internal data lines of the recording device are natively known, but not the image data input pins of the first serializer. A removable circuit board holding the first serializer must in this example comprise an interface, which connects the input pins, or the electrical data lines of the circuit board which open into the input pins, to the internal data lines of the recording device. This interface, like the first serializer itself, is of course also individual, and the configuration device may determine which internal data line opens into which input pin of the first serializer only based on an associated netlist describing the particular interface.

The configuration device is furthermore preferably configured to consult a first abstraction map for the purpose of determining the configuration of the first deserializer. The first abstraction map is an assignment which assigns the possible configurations of the first serializer (or the second serializer—since both are interchangeable, and the configuration data stream may be applied to both serializers, it is immaterial from a technical point of view whether the abstraction map is formally assigned to the first or second serializer) to technical functionalities of the first serializer, a functionality of a given component being understood to be a set of technical functions for whose execution the particular component is configured. In other words, the first abstraction map thus comprises, for a multiplicity of specific configurations of the first serializer, a detailed description of the technical behavior of the first serializer effectuated by the particular configuration. The first abstraction map is preferably complete, i.e., it is designed to be so comprehensive that it assigns a technical functionality to every possible configuration of the first serializer. The first abstraction map may be designed as a listing of partial configurations, which assigns a technical function or multiple technical functions to each partial configuration, so that a particular configuration of the first serializer results as the sum of partial configurations, and the functionality assigned to the particular configuration results as the sum of the functions assigned to the particular partial configurations. In an example, a partial configuration is understood to be a possible configuration of a number of registers, which represents a subset of all registers provided for the configuration of the first serializer.

In this example, the configuration device is designed to determine a functionality of the first serializer by applying the first abstraction map to the configuration of the first serializer. The configuration device then consults a compatibility map, which assigns a functionality of the first deserializer to each of the possible functionalities of the first serializer. The compatibility map is preferably also complete and thus assigns a functionality of the first deserializer to each of the possible functionalities of the first serializer. Each functionality of the first deserializer assigned by the compatibility map is designed in such a way that the first deserializer carrying out the particular functionality prepares the image data stream and distributes it to the internal data lines of the recording device in such a way that the first serializer is able to carry out the functionality determined with the aid of the first abstraction map as provided. The configuration device applies the compatibility map to the determined functionality of the first serializer to determine a functionality of the first deserializer. This determination of a functionality of the first deserializer may take place directly, indirectly, or both directly and indirectly.

After the determination of the functionality of the first deserializer, the configuration device consults a first concretization map, which in each case assigns a configuration of the first deserializer to functionalities of the first deserializer. The configuration device applies the first concretization map to the determined functionality of the first deserializer, determines the configuration of the first deserializer thereby, and configures the first deserializer according to its determined configuration.

A compatibility map may be designed as a functionality map, which assigns in each case a functionality of the first deserializer directly to possible functionalities of the first serializer.

A compatibility map may also comprise a second abstraction map and a second concretization map. The second abstraction map assigns in each case a specification of the image data stream to possible functionalities of the first serializer. A specification of the image data stream is understood to be a user-level description of the technical design of the image data and the image data flow, which, however, does not comprise any specific information about technical equipment or measures for preparing image data or for routing the image data flow, for the purpose of processing the image data and the image data flow according to the description. For example, a source address and a destination address may be specified directly or indirectly in the specification of the image data stream, but not information about the internal ports or data links via which the image data are to be conducted for the purpose of transmitting the stream from the source address to the destination address. For example, characteristic variables comprehensible to one skilled in the art may be specified in the specification of the image data stream for the image data and/or the image data flow, for example a transmission frequency or a formatting, but not information about settings to be made for the purpose of configuring the image data according to the specifications. The second concretization map assigns in each case a functionality of the first deserializer to possible specifications of the image data, each of the functionalities assigned by the second concretization map being designed in such a way that the first deserializer prepares the image data and distributes them to the internal data lines of the recording device in such a way that the image data stream output by the first deserializer fulfills the determined specification of the image data stream. In addition, each functionality assigned by the second concretization map is designed in such a way that the first deserializer is able to receive and prepare an image data stream fulfilling the determined specification according to the determined functionality.

In summary, the recording device is therefore configured in an example to translate a configuration of the first serializer predefined by the configuration data stream into a more abstract technical description of the functionality of the first serializer with the aid of at least one special abstraction map, to subsequently read out from at least one special compatibility map a technical description of a functionality of the first deserializer, which is on a similar level of abstraction and which configures the first deserializer to prepare the image data stream and to distribute it to the input pins of the first serializer in such a way that the first serializer is able to carry out its technical functionality as provided, and finally to translate the technical functionality of the first deserializer into a configuration of the first deserializer with the aid of a special concretization map.

In the OSI reference model (Open Systems Interconnection model), this means that the first abstraction map translates a specific configuration, in particular a register setting, into a technical description of the specific configuration in a higher layer, in particular in one or multiple of layers 2 through 5. The second abstraction map translates the technical description from the first abstraction map into a further technical description in an even higher layer, in particular in one or both of layers 6 and 7. The second concretization map translates the technical description resulting from the second abstraction map into a listing of technical functions of the first deserializer. This listing of technical functions is a technical description of a functionality of the first deserializer, which is further categorized in at least one of the lower, more hardware-specific layers in the OSI reference model, in particular in one or multiple of layers 2 through 5. The first concretization map concretizes the available information about the functionality of the first deserializer into a specific configuration, in particular a register setting, of the first deserializer.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows the derivation of a configuration of the first deserializer in an example;

DETAILED DESCRIPTION

Figure 1:
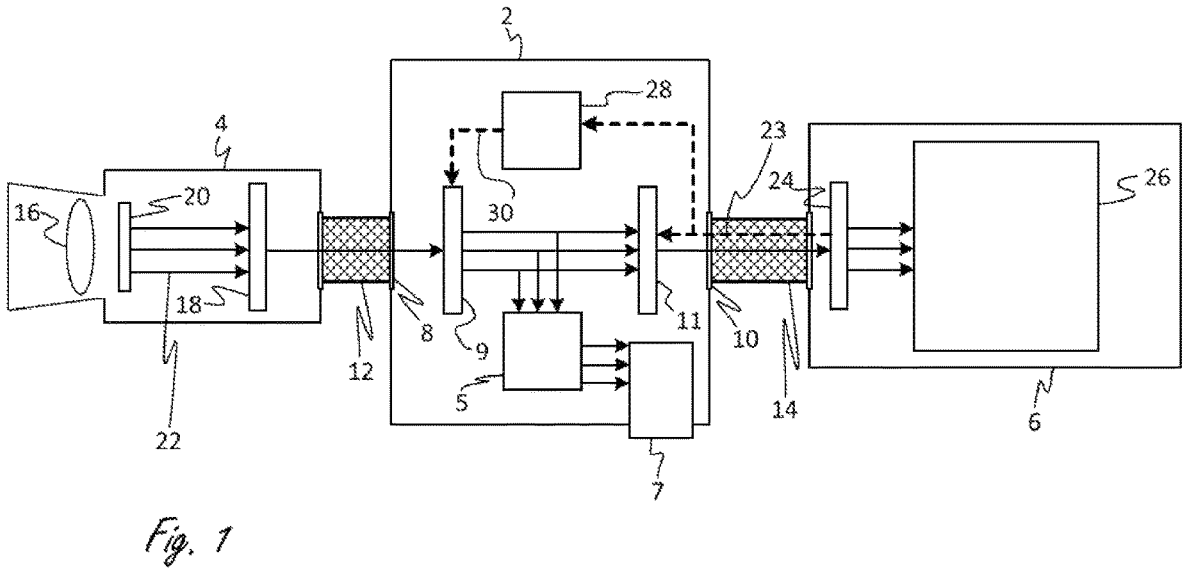
FIG. 1 shows a typical layout, including a sensor device, a recording device according to the invention, and a receiving device.

The illustration of FIG. 1 shows a recording device 2, which includes a first data interface 8, a second data interface 10, a first serializer 11, and a first deserializer 9. A first data link 12 present at first data interface 8 connects recording device 2 to a sensor device 4, and a second data link 14 present at second data interface 10 connects recording device 2 to a receiving device 6. Sensor device 4 is an imaging sensor device and may be designed, for example, as a camera, infrared camera, lidar unit (Light Detection and Ranging), or radar unit (Radio Detection and Ranging).

Sensor device 4 comprises an imaging system 16, for example a camera optical system, for imaging an electromagnetic field on an image plane and a sensor 20 arranged on the image plane for reconstructing a digitally coded map of the surroundings of sensor device 4 from the electromagnetic field. Sensor 20 is configured to continuously translate the electromagnetic field into image data frames, each of which represents one snapshot of the surroundings of the sensor device, and to continuously send the image data frames as image data stream 22 via the internal data lines of sensor device 4. Data image stream 22 is depicted as solid arrows in the overall illustration of FIG. 1. A second serializer 18 is arranged in sensor device 4 to receive and serialize image data stream 33 and output serialized image data stream 22 to first data link 12.

A second deserializer 24 is arranged in receiving device 6 to receive image data stream 22 from second data link 14, to deserialize it, and to forward deserialized image data stream 22 to a processor unit 26 of receiving device 6 via internal data lines of receiving device 6. Receiving device 6 may be designed, for example, as a control unit, a perception routine for recognizing and classifying objects in image data stream 22 may be configured in processor unit 26, and also a decision routine for generating control commands based on the classified objects.

Recording device 2 is arranged between sensor device 4 and receiving device 6 for the purpose of recording image data stream 22 output by sensor device 4. To ensure a proper functioning of both sensor device 4 and receiving device 6, recording device 2 is designed as a man in the middle. This means that recording device 2 does not identify itself to either sensor device 4 or receiving device 6 even though all data exchanged between sensor device 4 and receiving device 6 flow through recording device 2. In normal operation, recording device 2 emulates receiving device 6 to communicate directly with sensor device 4 and emulates sensor device 4 to communicate directly with receiving device 6. From the perspective of sensor device 4 and receiving device 6, first data link 12 and second data link 14 act as though they are a single, direct data link.

First deserializer 9 is arranged and configured to receive serialized image data stream 22 from first data interface 8, to deserialize it, and to forward deserialized image data stream 22 to first serializer 11 via internal data lines L1, . . . , L10 of recording device 2. Recording device 2 comprises a storage device 5, which is configured to record the data stream deserialized by first deserializer 9 and to store the recording of image data stream 22 on a data carrier 7 inserted into a drive of the recording device.

First serializer 11 is arranged and configured to receive deserialized image data stream 22 recorded by storage device 5 from deserializer 9, re-serialize it, and output it via second data interface 10 and conduct it to second data link 14.

Serializers and deserializers may be configured with respect to their technical functionality, normally by setting a register. During normal operation, i.e., when sensor device 4 and receiving device 6 communicate with each other directly without the presence of recording device 2, receiving device 6 configures second deserializer 24 during startup and sends a configuration data stream 23 for configuring second serializer 18 in sensor device 4. Configuration data streams for configuring serializers and deserializers are represented as dashed arrows in the entire illustration of FIG. 1.

Configuration data stream 23 defines a configuration or a register setting of second serializer 18, and sensor device 4 is designed to receive configuration data stream 23 and to configure second serializer 18 according to the specification of the configuration data stream. Configuration data stream 23 may be generated by second deserializer 24 itself or by another component of receiving device 6. On the part of sensor device 4, second serializer 18 may likewise itself receive configuration data stream 23 and configure it itself according to the specification thereof, or another component of sensor device 4 may receive configuration data stream 23 and configure second serializer 18.

First serializer 11 belongs to the same production series as second serializer 18. Both are therefore identical with respect to their technical equipment and their technical design and may be exchanged with each other. As a result, configuration data stream 23 may be used directly to configure first serializer 11, and recording device 2 is configured to intercept configuration data stream 23 actually provided for second serializer 18 and configure first serializer 11 with the aid of configuration data stream 23.

The technical functionality of first serializer 11 thus exactly corresponds to the provided technical functionality of second serializer 18, since the two serializers are from the same production series, and first serializer 11 was configured with the aid of configuration data stream 23 provided for second serializer 18. First deserializer 9 must be configured to prepare image data stream 22 supplied by sensor device 4 and to distribute it to the internal data lines of recording device 2 or to the input pins of first serializer 11 in such a way that first serializer 11 is able to carry out its technical functionality predefined by configuration data stream 23. Finally, the first deserializer must be configured to reverse the serialization of image data stream 22 carried out by second serializer 18 and to reconstruct the image data stream output by sensor 20. Unlike the configuration of first serializer 11, this configuration of first deserializer 9 may not be carried out directly because receiving device 6 does not provide a configuration data stream suitable for this purpose.

For the purpose of determining and carrying out such a configuration of first deserializer 9, recording device 2 comprises a configuration device 28, which is configured to record configuration data stream 23 and analyze the recording of the configuration data. (If configuration data stream 23 according to the teaching of DE 10 2019 132 476 A1 is converted into another configuration data stream, configuration device 28 records the converted configuration data stream at this point.) With the aid of the information obtained as the result of the analysis, configuration device 28 determines a configuration of first deserializer 9 which configures first deserializer 9, for the purpose of formatting the image data from the image data stream in the correct manner expected by configured first serializer 11, and distributing them to the input pins of first serializer 11. Upon conclusion of the determination, configuration device 28 generates a deserializer configuration data stream 30, which is suitable for configuring first deserializer 9 as determined in the analysis and configures first deserializer 9 with the aid of deserializer configuration data stream 30.

Even though configuration device 28 is shown in the illustration in FIG. 1 as an integral component of recording device 2, configuration device 28 may just as easily be arranged outside recording device 2, including as a virtual component, e.g., in the form of software stored on a personal computer (PC). In this case the transmission of configuration data stream 23 as well as deserializer configuration data stream 30 may take place via a suitable data interface, for example a USB cable or a wireless data link such as WLAN or Bluetooth. Configuration device 28 may also be designed in the form of a server which may be contacted over the Internet, so that the entire configuration process runs in the form of a firmware update of recording device 2.

Figure 2:
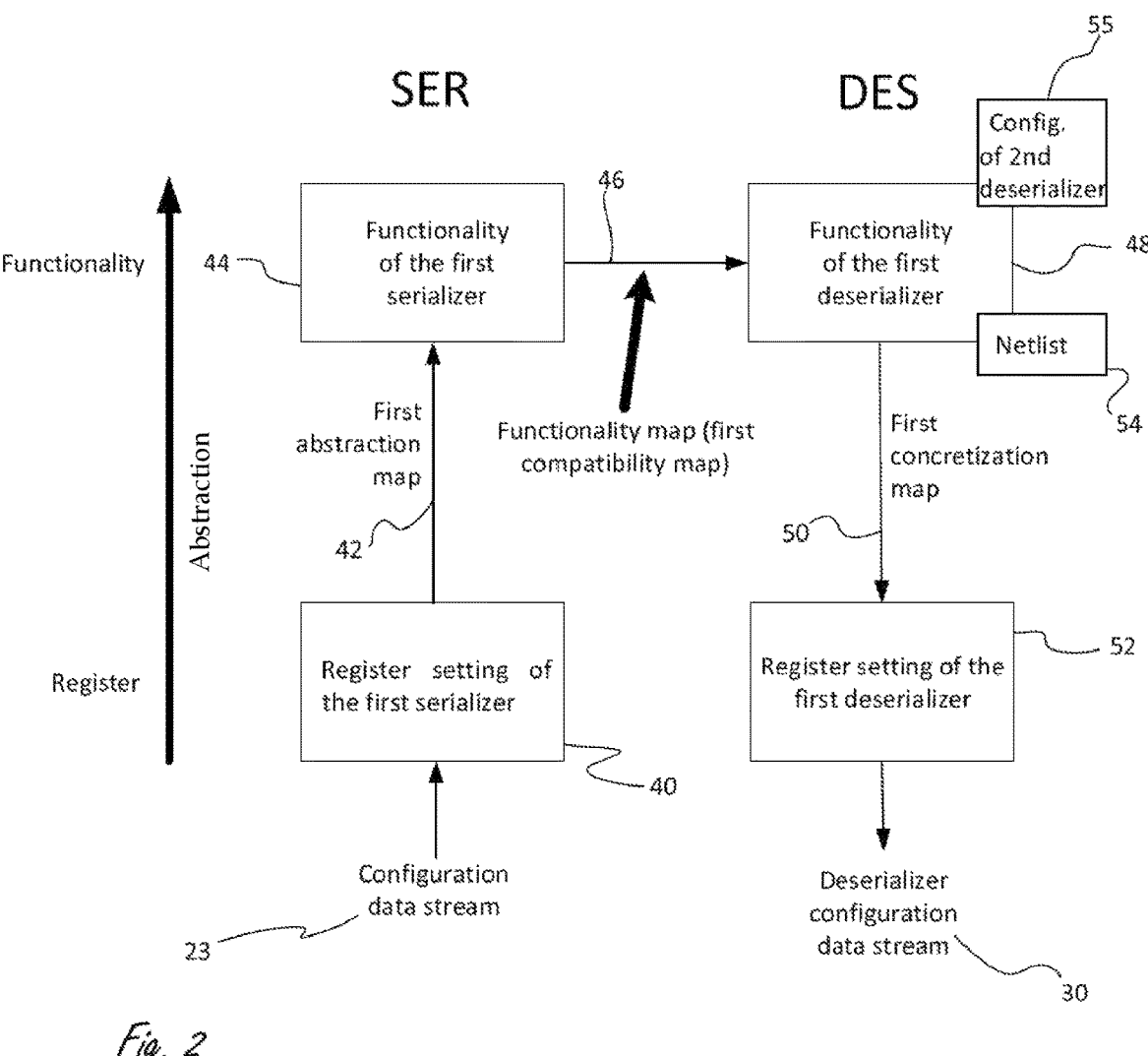
FIG. 2 shows the derivation of a configuration of the first deserializer in an example.
Figure 4:
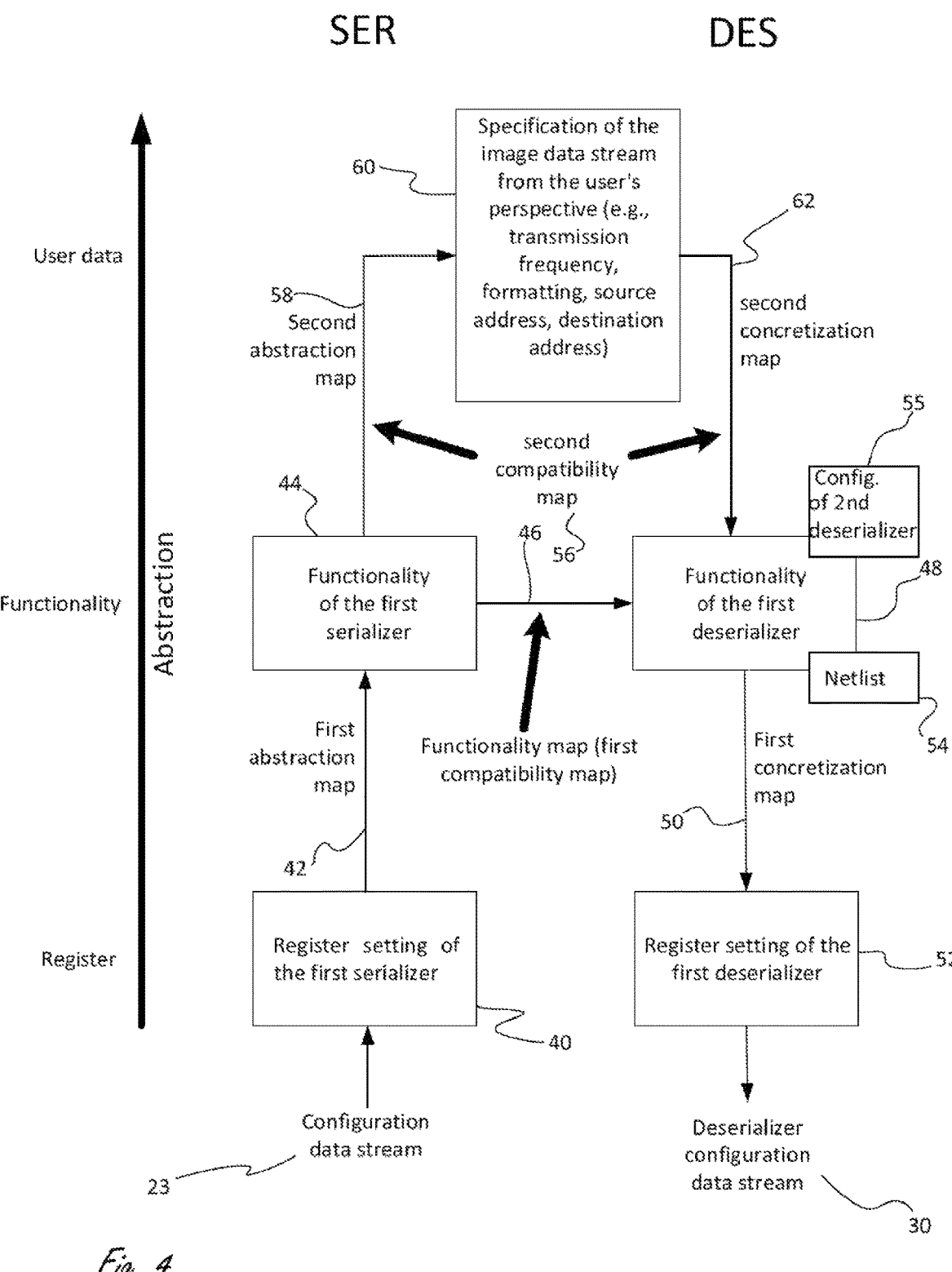
FIG. 4 shows the derivation of a configuration of the first deserializer in an example.

The illustrations in FIGS. 2 through 4 explain, in the form of flowcharts, the steps undertaken by configuration device 28 to derive the configuration of first deserializer 9. FIGS. 2 through 4 show three examples of the automated derivation of the configuration of first deserializer 9 with the aid of configuration device 28. Steps which relate to first serializer 11 are arranged in each case under the heading "SER" on the left side of the diagram. Steps which relate to first deserializer 9 are arranged in each case under the heading "DES" on the right side of the diagram.

As shown in the illustration in FIG. 2, the first step is to determine the specific configuration of first serializer 11. Assuming that the configuration of first serializer 11 is defined by a register setting of first serializer 11, the specific configuration corresponds to a specific register setting 40 of first serializer 11. As already explained in the description of FIG. 1, the receiving device supplies register setting 40 of first serializer 11 directly in the form of configuration data stream 23, and configuration device 28 reads register setting 40 directly from the recording of configuration data stream 23.

In the second step, configuration device 28 consults a first abstraction map 42 for the purpose of deriving a functionality 44 of first serializer 11 from register setting 40 of first serializer 11, based on first abstraction map 42. First abstraction map 42 is basically an overview in table form, which compares the register settings of first serializer 11 with technical functionalities of first serializer 11 and is sufficiently comprehensive that a functionality of the first serializer resulting from the particular register setting may be read out for each possible register setting of first serializer 11. First abstraction map 42 advantageously lists settings of individual registers or partial register settings, i.e. settings of small groups of registers, and assigns a function or a partial functionality of first serializer 11 to each individual register setting and/or each partial register setting, so that functionality 44 of first serializer 11 results as the totality of functions and/or partial functionalities.

Functionality 44 of first serializer 11 is a listing of technical functions of first serializer 11, which results from register setting 40 of the first serializer but no longer has a reference to the model or to the production series of first serializer 11 and, in particular, has no reference to specific partial configurations of first serializer 40.

After deriving functionality 44 of first serializer 11, configuration device 28 consults a first compatibility map 46 for the purpose of deriving a functionality 48 of the first deserializer from functionality 44 of first serializer 11, based on first compatibility map 46. A compatibility map is a map which assigns the possible functions and/or partial functionalities of first serializer 11 to functions and/or partial functionalities of first deserializer 9 which first deserializer 9 must have so that, on the one hand, a reasonable, interpretable image data stream 23 according to image data stream 23 output by sensor 20 is available to storage device 5 and, on the other hand, first deserializer 9 may properly carry out the particular function or partial functionality.

As a random example in functionality 44 of first serializer 11, a sequence may be predefined, in which first serializer 11 and second serializer 18 output the image data in the serialized image data stream. The first deserializer must, of course, consider this sequence in order to reconstruct a reasonable, readable stream of image data frames from the image data stream supplied via first data link 12. In keeping with the sequence predefined by configuration data stream 23, configuration device 28 determines a configuration of first deserializer 9, which configures first deserializer 9 to reverse a serialization of image data stream 23 carried out in this very sequence for the purpose of reconstructing the original image data frames from serialized image data stream 23, as output by sensor 18.

First compatibility map 46 is designed as a functionality map, i.e., as an assignment in table form, which assigns functions and/or partial functionalities and/or functionalities of first serializer 11 directly to functions and/or partial functionalities and/or functionalities of the first deserializer, so that a functionality 48 of the first deserializer may be derived from functionality 46 of first serializer 11 with the aid of first compatibility map 46. Functionality 48 of first deserializer 9 is described on the same abstraction level as functionality 44 of first serializer 11, i.e., it comprises a listing of technical functions and/or partial functionalities without a reference to a particular deserializer production series, a particular deserializer model, or specific partial configurations of first deserializer 9.

Finally, configuration device 28 derives a specific configuration, i.e., a specific register setting 52 of first deserializer 9, from functionality 48 of first deserializer 9 and consults a first concretization map 50 for this purpose. In terms of its contents, first concretization map 50 is similar to first abstraction map 42, i.e., it assigns registers and/or partial register settings of first deserializer 9 in table form to functions and/or partial functionalities of first deserializer 9, while configuration device 28 uses it in reverse order. After determining register setting 52, configuration device 28 generates deserializer configuration data stream 30 in such a way that deserializer configuration data stream 30 configures the registers of first deserializer 9 according to determined register setting 52 of the first deserializer and configures first deserializer 9 with the aid of deserializer configuration data stream 30.

If second deserializer 24 supports this function, configuration device 28 reads out configuration 55 of second deserializer 24 via second data link 14 and takes into account configuration 55 of second deserializer 24 when determining register setting 52 of first deserializer 9. Since first deserializer 9 and second deserializer 24 process a serialized image data stream 22 of the same type, the probability is high that some configuration features of second deserializer 24 may be applicable to first deserializer 9 as well.

Figure 5:
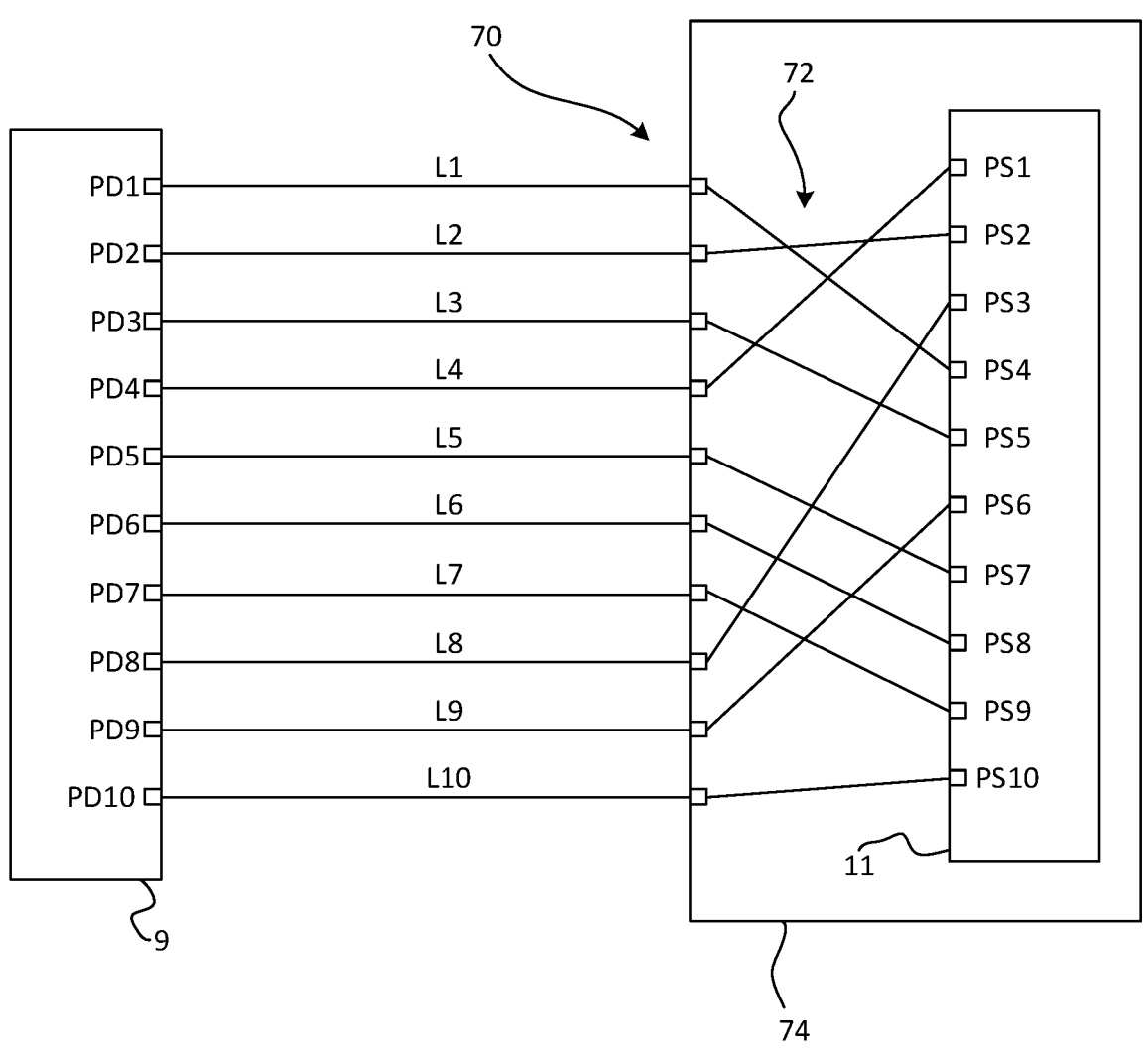
FIG. 5 shows an example of a netlist.

When deriving register setting 52 of first deserializer 9 based on first concretization map 50, configuration device 28 additionally consults a netlist 54, which correlates input pins PS1, . . . , PS10 of the first serializer with internal data lines L1, . . . , L10 of recording device 2. Netlist 54 is explained in the illustration in FIG. 5. As explained above, first serializer 11 must emulate the functionality of second serializer 18 and therefore advantageously belongs to the same production series as second serializer 18. As a result, first serializer 11 has a customer-specific design and is therefore arranged on a removable circuit board 74. Output pins PD1, . . . , PD10 of first deserializer 9, to which first deserializer 9 outputs deserialized image data stream 22, lead to internal data lines L1, . . . , L10 of recording device 2. Internal data lines L1, . . . , L10, in turn, open into an interface 70 of circuit board 74. Interface 70 provides an input for each internal data line L1, . . . , L10, and the inputs are connected to input pins PS1, . . . , PS10 of first serializer 11 via electrical connections 72 in circuit board 74. In this way, a data link to one of input pins PS1, . . . , PS10 of first serializer 11 is configured for each necessary output pin PD1, . . . , PD10 of first deserializer 9 for the purpose of transmitting image data from first deserializer 9 to first serializer 11. However, which data line L1, . . . , L10 opens into which input pin PS1, . . . , PS10 is, of course, dependent on the production series of first serializer 11 and on the configuration of electrical connections 72. Configuration device 28 requires this information to determine register setting 52 of the first deserializer and obtains it from netlist 54. Netlist 54 is an assignment in table form, from which it is apparent which data line L1, . . . , L10 or which output pin PD1, PD10 is connected to which input pin PS1, . . . , PS10.

FIGS. 3 and 4 shows alternative examples of the automated derivation of register setting 52 of first deserializer 9. Only the differences from FIG. 2 are explained in the descriptions below.

The illustration in FIG. 3 shows a sequence, in which first compatibility map 46 is replaced by a two-step second compatibility map 56, and a further abstraction level is introduced by second compatibility map 56. Second compatibility map 56 comprises a second abstraction map 58, which assigns specifications of image data stream 22 to functionalities of first serializer 11 as an overview in table form. Configuration device 28 consults second abstraction map 58 for the purpose of deriving a specification 60 of image data stream 22 from functionality 44 of first serializer 11, based on the second abstraction map. This specification 60 is a technical description of image data stream 60 from the user's perspective. It comprises general characteristic variables of the image data stream, but not information about technical measures or settings of the hardware participating in the transmission of image data stream 22, in particular about functionalities 44, 48 of first serializer 11 or first deserializer 9. It is therefore on an even higher abstraction level than the two descriptions 44, 48 of the functionalities and may not be clearly assigned to either first serializer 44 or first deserializer 48. Possible examples of characteristic values specified in the specification of the image data stream are transmission frequency, formatting of the image data, as well as a source address or a destination address of the image data stream.

Second compatibility map 56 further comprises a second concretization map 62. Configuration device 28 consults second concretization map 62 for the purpose of deriving functionality 48 of the first deserializer from specification 60 of image data stream 22. In terms of its contents, second concretization map 62 is similar to second abstraction map 58, i.e., it assigns functionalities of first deserializer 9 to specifications of image data stream 22 resulting from these very functionalities, while configuration device 28 uses them in reverse order. After generating specification 60 of image data stream 22, configuration device 28 applies second concretization map 62 to specification 60 for the purpose of reading out from the second concretization map which functionalities first deserializer 9 must have in order to generate an image data stream 22 which fulfills these very specifications.

The illustration in FIG. 4 shows a combined example, in which configuration device 28 makes use of first compatibility map 56 as well as second compatibility map 60 to derive functionality 48 of first deserializer 9. In this example, determined functionality 48 of the first deserializer results as the combined quantity of the functions and/or partial functionalities of first deserializer 9 derived with the aid of first compatibility map 46 and with the aid of second compatibility map 56.

It is evident that, to carry out the steps described above, configuration device 28 requires access to the information necessary for this purpose, i.e., abstraction maps 42, 58, concretization maps 62, 50, netlist 54, and possibly functionality map 46. A database is advantageously provided, which includes a multiplicity of abstraction maps 42, 58, netlists 54, and possibly compatibility maps 46 to be able to carry out an automatic configuration of first deserializer 9 according to the invention for a multiplicity of possible production series of first serializer 11. Since a uniform production series of first deserializer 9 is provided in the presented example, it is not necessary to provide different examples of first concretization map 50 and second concretization map 62. If necessary, however, it is, of course, also possible to add a multiplicity of concretization maps 50, 62 for different production series of first deserializer 9. The information suitable for first serializer 11 (at least first abstraction map 42 and netlist 54, if necessary second abstraction map 58 and/or compatibility map 56) must be stored on a storage medium readable by configuration device 28.

Figure 6:
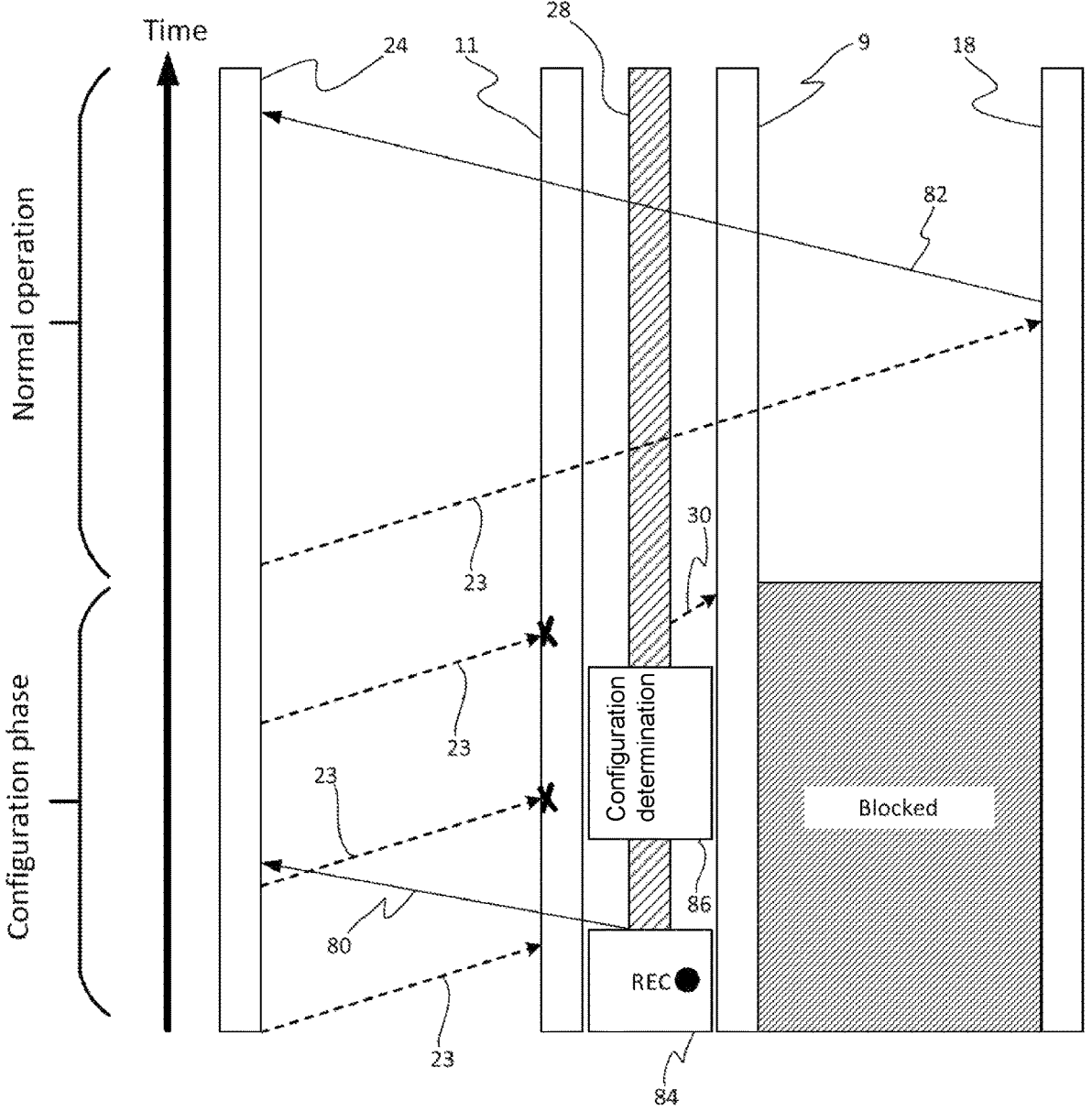
FIG. 6 shows a time curve of the configuration process according to the invention.

In the illustration in FIG. 6, the signal flows and the work steps carried out by configuration device 28 are shown on a time axis. At the beginning (on the time axis, at the bottom), i.e., after recording device 2 is switched on, recording device 2 first enters a configuration phase. During the configuration phase, recording device 2 blocks the data flow on second data link 14, so that no communication is possible between second deserializer 24 and second serializer 18. Recording device 2 first places configuration device 28 into a receiving mode 84, within which configuration device 28 waits for configuration data stream 23. After receiving device 6 is switched on, second deserializer 24 transmits configuration data stream 23 for the purpose of configuring second serializer 18. Recording device 2 intercepts configuration data stream 23 in such a way that receiving device 6 configures first serializer 11 instead of second serializer 18. Second serializer 18 remains unconfigured for the time being. Configuration device 28 generates a recording of configuration data stream 23, stores the recording, and ends receiving phase 84.

After the transmission of configuration data stream 23, second deserializer 24 waits for a confirmation signal 82 from sensor device 4 to confirm that sensor device 4 is fully configured and ready for use. After confirmation signal 82 fails to arrive, due to blocked second data link 14, second deserializer 24 undertakes further attempts to configure second serializer 18 by repeatedly transmitting configuration data stream 23. Until the conclusion of the configuration phase, recording device 2 intercepts all repeatedly transmitted configuration data streams 23, so that the repeated configuration attempts remain without effect.

After configuration data stream 23 has been stored, configuration device 28 enters a configuration determination mode 86, within which configuration device 28 carries out the work steps described above for one of FIG. 2, 3, or 4 to determine a configuration or register setting of first deserializer 9. After determining the configuration, configuration device 28 generates deserializer configuration data stream 30 and transmits it to first deserializer 9 for the configuration thereof.

After the configuration of first deserializer 9 has been concluded, and recording device 2 is thus fully configured and ready for use, recording device 2 ends the configuration phase and cancels the blockage of second data link 14. Recording device 2 transitions into a normal operation, within which it forwards each communication between sensor device 4 and receiving device 6 unchanged. During normal operation, sensor device 4 and receiving device 6 may exchange data as though recording device 2 were not present. First configuration data stream 23 transmitted by second deserializer 24 after the completion of the configuration phase properly reaches second serializer 18. After completion of the configuration of second serializer 18, sensor device 4 confirms the readiness for use of the sensor device by transmitting confirmation signal 82. After confirmation signal 82 has been received, receiving device 6 also transitions into a normal operation, after which the overall layout shown in the illustration in FIG. 1 is ready for use.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A recording device to record a serialized image data stream flowing from a sensor device to a receiving device, the recording device comprising:

a first data interface to establish a first data link between the first data interface and the sensor device to transmit the image data stream to the first data interface;

a first deserializer to deserialize the image data stream received at the first data interface;

a storage device to record the image data stream deserialized by the first deserializer and store image data from the image data stream on a storage medium;

a configuration device to record a configuration data stream transmitted by the receiving device to configure a serializer arranged in the sensor device to serialize an image data stream output by a sensor and to feed the serialized image data stream to the first data link, to analyze the recording of the configuration data and determine a preparation of the serialized image data stream by the serializer arranged in the sensor device based on the analysis, to determine, with the aid of the information obtained as the result of the analysis, a configuration of the first deserializer, which configures the first deserializer to reconstruct the image data stream output by the sensor, and to configure the first deserializer according to the determined configuration of the first deserializer;

a second data interface to establish a second data link between the second data interface and the receiving device to transmit the image data stream to the receiving device; and a first serializer to re-serialize the image data stream after it is recorded by the storage device and to output the re-serialized image data stream by the second data interface, and which comprises a plurality of input pins for receiving image data, wherein the configuration device is configured: to record a configuration data stream transmitted by the receiving device to the second data interface via the second data link for the purpose of configuring a second serializer, which is arranged in the sensor device for serializing the image data stream transmitted via the first data link; to analyze the recording of the configuration data and to determine, based on the analysis, how the image data stream is to be prepared for the first serializer and distributed to the input pins of the first serializer; and to design the configuration of the first deserializer such that the configuration of the first deserializer configures the first deserializer, prepares the image data stream as determined in the analysis, and distributes it to the input pins of the first serializer.

2. The recording device according to claim 1, wherein the first serializer and the second serializer belong to the same production series, and the recording device is configured to configure the first serializer with the aid of the configuration data stream, or wherein the first serializer and the second serializer belong to different production series, and the configuration device is configured to convert the configuration of the second serializer predefined by the configuration data stream into a configuration of the first serializer having the same technical function, and to configure the first serializer according to the configuration having the same technical function.

3. The recording device according to claim 2, wherein the recording device is configured to intercept the configuration data stream such that the receiving device configures the first serializer instead of the second serializer with the aid of the configuration data stream.

4. The recording device according to claim 3, wherein the recording device is configured to intercept configuration data streams repeatedly transmitted by the receiving device, in particular all transmitted configuration data streams, until the configuration of the first deserializer is completed.

5. The recording device according to claim 4, wherein the recording device is configured to forward repeatedly transmitted configuration data streams to the sensor device until the configuration of the first deserializer is completed to configure the second serializer.

6. The recording device according to claim 5, wherein the recording device is configured to forward a confirmation signal transmitted by the sensor device after the completion of the configuration of the second serializer to confirm a readiness for use of the sensor device to the receiving device.

7. The recording device according to claim 1, wherein the configuration device is configured to take into account, during the determination of the configuration of the first deserializer, a netlist, which describes the data links of input pins of the first serializer having a number of internal data lines of the recording device for transmitting image data to the input pins.

8. A recording device to record a serialized image data stream flowing from a sensor device to a receiving device, the recording device comprising:

a first data interface to establish a first data link between the first data interface and the sensor device to transmit the image data stream to the first data interface;

a first deserializer to deserialize the image data stream received at the first data interface;

a storage device to record the image data stream deserialized by the first deserializer and store image data from the image data stream on a storage medium; and a configuration device to record a configuration data stream transmitted by the receiving device to configure a serializer arranged in the sensor device to serialize an image data stream output by a sensor and to feed the serialized image data stream to the first data link, to analyze the recording of the configuration data and determine a preparation of the serialized image data stream by the serializer arranged in the sensor device based on the analysis, to determine, with the aid of the information obtained as the result of the analysis, a configuration of the first deserializer, which configures the first deserializer to reconstruct the image data stream output by the sensor, and to configure the first deserializer according to the determined configuration of the first deserializer, wherein the configuration device is configured to read out, for the analysis, an existing configuration of a second deserializer, which is installed in the receiving device for deserializing the image data stream transmitted via the second data link, and to take it into account when determining the configuration of the first deserializer.

9. A recording device to record a serialized image data stream flowing from a sensor device to a receiving device, the recording device comprising:

a first data interface to establish a first data link between the first data interface and the sensor device to transmit the image data stream to the first data interface;

a first deserializer to deserialize the image data stream received at the first data interface;

a storage device to record the image data stream deserialized by the first deserializer and store image data from the image data stream on a storage medium; and a configuration device to record a configuration data stream transmitted by the receiving device to configure a serializer arranged in the sensor device to serialize an image data stream output by a sensor and to feed the serialized image data stream to the first data link, to analyze the recording of the configuration data and determine a preparation of the serialized image data stream by the serializer arranged in the sensor device based on the analysis, to determine, with the aid of the information obtained as the result of the analysis, a configuration of the first deserializer, which configures the first deserializer to reconstruct the image data stream output by the sensor, and to configure the first deserializer according to the determined configuration of the first deserializer, wherein the configuration device is configured to determine the configuration of the first deserializer, to consult a first abstraction map, which assigns a technical functionality of the serializer to each of the possible configurations of the serializer or all possible configurations of the serializer, to determine a functionality of the serializer by applying the first abstraction map to the configuration of the serializer, to consult a at least one compatibility map, which assigns a functionality of the first deserializer to each of the possible functionalities of the serializer or all possible functionalities of the serializer, to determine a functionality of the first deserializer by applying the compatibility map to the determined functionality of the serializer, to consult a first concretization map, which assigns, in each case, a configuration of the first deserializer to functionalities of the first deserializer or all functionalities of the first deserializer, and to determine the configuration of the first deserializer by applying the first concretization map to the determined functionality of the first deserializer.

10. The recording device according to claim 9, wherein a compatibility map is designed as a functionality map to assign a functionality of the first deserializer to each of the possible functionalities or to all possible functionalities of the first serializer.

11. The recording device according to claim 9, wherein the compatibility map comprises:

a second abstraction map, which assigns a specification of the image data stream to each of the possible functionalities of the serializer or to all possible functionalities of the serializer; and a second concretization map, which assigns a functionality of the first deserializer to each of the possible specifications of the image data stream or all possible specifications of the image data stream.

12. The recording device according to claim 9, wherein the configuration device is configured to determine the functionality of the first deserializer, to consult a first compatibility map and to apply it to the determined functionality of the first serializer, and to consult a second compatibility map and to apply it to the determined functionality of the first serializer.

13. A recording device to record a serialized image data stream flowing from a sensor device to a receiving device, the recording device comprising:

a first data interface to establish a first data link between the first data interface and the sensor device to transmit the image data stream to the first data interface;

a first deserializer to deserialize the image data stream received at the first data interface;

a storage device to record the image data stream deserialized by the first deserializer and store image data from the image data stream on a storage medium; and a configuration device to record a configuration data stream transmitted by the receiving device to configure a serializer arranged in the sensor device to serialize an image data stream output by a sensor and to feed the serialized image data stream to the first data link, to analyze the recording of the configuration data and determine a preparation of the serialized image data stream by the serializer arranged in the sensor device based on the analysis, to determine, with the aid of the information relating to the preparation of the image data stream obtained as the result of the analysis, a configuration of the first deserializer, which configures the first deserializer to reconstruct the image data stream output by the sensor, and to configure the first deserializer according to the determined configuration of the first deserializer, wherein the configuration device is configured to read out, for the analysis, an existing configuration of a second deserializer, which is installed in the receiving device for deserializing an image data stream transmitted via a second data link, and to take it into account when determining the configuration of the first deserializer.

*    *    *    *    *